United States Patent [19]

Zecher et al.

[11] Patent Number: 4,908,429

[45] Date of Patent: Mar. 13, 1990

[54] SPECIAL POLYIMIDES AS THERMOPLASTS

[75] Inventors: Wilfried Zecher, Leverkusen; Dieter Arlt, Cologne; Aziz E. Sayed, Leverkusen, all of Fed. Rep. of Germany

[73] Assignee: Bayer Aktiengesellschaft, Leverkusen, Fed. Rep. of Germany

[21] Appl. No.: 190,452

[22] Filed: May 5, 1988

[30] Foreign Application Priority Data

May 13, 1987 [DE] Fed. Rep. of Germany ....... 3715890

[51] Int. Cl.$^4$ ............................................ C08G 69/26
[52] U.S. Cl. .................................. 528/353; 528/125; 528/126; 528/172; 528/176
[58] Field of Search ............... 528/353, 125, 126, 172, 528/176

[56] References Cited

U.S. PATENT DOCUMENTS

| | | | |
|---|---|---|---|
| 2,710,853 | 6/1955 | Edwards et al. | 260/78 |
| 2,867,609 | 1/1959 | Edwards et al. | 260/78 |
| 2,880,230 | 3/1959 | Edwards et al. | 260/475 |
| 3,234,181 | 2/1966 | Olivier | 528/353 |
| 3,803,085 | 4/1974 | Takekoshi et al. | 260/46.5 E |
| 3,833,544 | 9/1974 | Takekoshi et al. | 260/47 CB |
| 3,847,867 | 11/1974 | Heath et al. | 260/47 CP |
| 3,905,942 | 9/1975 | Takekoshi et al. | 260/47 CP |
| 3,991,004 | 11/1976 | Takekoshi et al. | 260/37 N |
| 3,998,840 | 12/1976 | Williams, III et al. | 260/326 N |
| 4,011,198 | 3/1977 | Takekoshi et al. | 260/47 CP |
| 4,073,773 | 2/1978 | Banucci et al. | 260/47 CP |
| 4,324,882 | 4/1982 | Takekoshi | 528/206 |
| 4,417,044 | 11/1983 | Parekh | 528/179 |
| 4,696,994 | 9/1987 | Nakajima et al. | 528/176 |

OTHER PUBLICATIONS

Pater, R. H. (Nov./Dec. 1981) Sampe J., p. 17–25.

Primary Examiner—John Kight
Assistant Examiner—M. L. Moore
Attorney, Agent, or Firm—Connolly and Hutz

[57] ABSTRACT

This invention relates to thermoplastic polyimides of 2,2-bis-phtalic acid anhydro-(4)-propane and 2,2-bis-(4-aminophenoxyphenyl-propane.

6 Claims, No Drawings

SPECIAL POLYIMIDES AS THERMOPLASTS

This invention relates to new special polyimides, their preparation and their use as thermoplasts.

Polyimides are obtained, for example, by the reaction of pyromellitic acid dianhydride with 4,4'-diaminodiphenylether (DBP 1 202 981) and are used in particular as temperature resistant films and moulded articles. One disadvantage of these polyimides is that they must be shaped from the solvent by way of the polyamide acid because the polyimides are insoluble in almost all solvents and another disadvantage is that they are not thermoplastic.

It has now been found that thermoplastic polyimide resins are obtained when 2,2-bis-phthalic acid anhydro-(4)-propane is reacted with 2,2-bis-(4-aminophenoxyphenyl)-propane at temperatures from 0° to 400° C., preferably from 10° to 250° C., and preferably in a solvent and optionally in the presence of further diamines, carboxylic acids or anhydrides.

The properties of the polyimides according to the invention must be regarded as surprising since reaction products of tetracarboxylic acid dianhydrides and aromatic diamines are generally obtained as jelly-like or solid masses when imidization is carried out from the solvents used, e.g. N-methylpyrrolidone, and can then no longer be processed on a technical scale or can only be worked up into materials which are considerably impaired in their product properties, e.g. the elasticity. The polyimides according to this invention, on the other hand, form stable solutions not only in aprotic solvents such as N-methylpyrrolidone and dimethylacetamide but also in less polar solvents and can be condensed in this phase and then worked up.

Another advantage of the materials according to the invention is that they are thermoplastic and can therefore be processed in evaporation extruders and can also be worked up by injection moulding or made up into films by extrusion processes.

The tetracarboxylic acid dianhydride used according to the invention is 2,2-bis-phthalic acid anhydro-(4)-propane corresponding to the following formula (I)

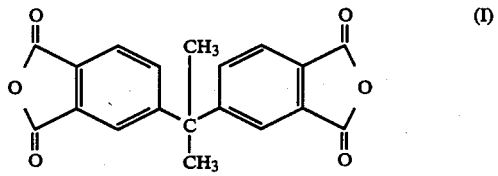

which may be prepared, for example, by the oxidation of 2,2-bis-[1,2-dimethylphenyl-(4)]-propane. Derivatives of the acid anhydride, such as alkyl or aryl semiesters, alkyl or aryl esters or amides or the free tetracarboxylic acid may be used instead of the acid anhydride.

The diamine which is reacted according to the invention is 2,2-bis-[4-aminophenoxyphenyl]-propane (II)

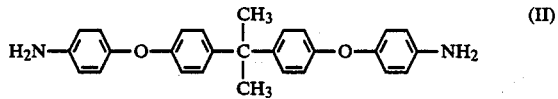

which may be substituted, e.g. with alkyl or halogen. Instead of the diamine, derivatives thereof may be used for the reaction according to the invention, e.g. the acetyl compounds, isocyanates or carbamic acid esters.

The diamine according to the invention may be prepared, for example, by catalytic hydrogenation of 2,2-bis-(4-nitro-phenoxyphenyl)-propane.

The following are examples of compounds which may be used for regulating the molecular weight: Monofunctional carboxylic acids such as acetic acid, lauric acid, stearic acid, benzoic acid and phenylacetic acid; monofunctional acid anhydrides such as phthalic acid anhydride, tetrachlorophthalic acid anhydride, phenylphthalic acid anhydride, and hexahydrophthalic acid anhydride; and monofunctional amines such as butylamine, dodecylamine, octadecylamine, cyclohexylamine, benzylamine, aniline and dodecylaniline, and derivatives and mixtures thereof.

The reaction according to the invention may be carried out solvent-free but is preferably carried out in solvents. The following are suitable solvents: (Halogenated) hydrocarbons, phenols, alcohols, esters, lactones, ketones, ethers, nitriles, amides, sulphoxides and sulphones, e.g. nitrobenzene, chlorobenzene, o-dichlorobenzene, methylene chloride, trichloroethylene, pyridine, phenol, o-, m- and p-cresol, caprolactone, acetophenone, cyclohexanone, diethylene glycol dimethylether, benzonitrile, dimethylacetamide, caprolactam, N-methylcaprolactam, N-methylpyrrolidone, N-cyclohexylpyrrolidone, dimethylsulphone, tetramethylenesulphone, and mixtures of these compounds.

To prepare the polyimides according to the invention, the components are kept at temperatures of from 0° to 400° C. for several minutes or up to several hours, with or without solvent. The progress of the reaction may be followed by the IR spectra, for example, and by the amount of water split off.

The reaction may be carried out continuously.

Polyimides having a relative viscosity of from 1.0 to 4.0, preferably 1.5 to 2.2, determined on a 1% solution in m-cresol at 25° C., have proved to be particularly suitable.

It is sometimes advantageous to carry out the reaction for their preparation in several stages or to add the individual components in a different sequence or at different temperatures. For example, the polyamide acid formed in the first stage may be prepared at temperatures of about 20° C. and then converted into the polyimide at higher temperatures, optionally under vacuum or with azeotropic distillation. Imidization may also be carried out by other suitable processes, including chemical processes such as the action of acetic acid anhydride or of acetic acid anhydride and pyridine or of carbodiimides.

According to a preferred embodiment, the polyimide or polyamide acid is prepared in a solvent and is concentrated in the same reaction vessel to a solution which is still fluid or to a resin melt and the remaining solvent is then evaporated off in an evaporation extruder, optionally with after-condensation and imidization and optionally under vacuum at temperatures from 250° to 400° C., preferably from 300° to 360° C.

According to another embodiment, the polyimide is prepared in a solvent and is worked up by precipitation, e.g. with water or methanol.

One Val of amine is generally put into the reaction per val of acetic anhydride although these proportions may be widely varied.

Other possible methods of preparation consist in mixing the bis-phthalic acid anhydride propane according to the invention with suitable tetracarboxylic acid dianhydrides and tri- or dicarboxylic acids and mixing the bis-[aminophenoxyphenyl]-propane according to the invention with suitable diamines.

The proportions of the components are chosen so that the polymers obtained can still be worked up thermoplastically without decomposition. The proportion of these polycarboxylic acids may be from 2 to 70 Val-% and the proportion of diaminesmay also be 2 to 70 Val-%, based on the acid anhydrides and amines according to the invention.

The following are examples of suitable polycarboxylic acids: Pyromellitic acid dianhydride, diphenyltetracarboxylic acid dianhydride, benzophenonetetracarboxylic acid dianhydride, cyclopentane tetracarboxylic acid dianhydride, trimellitic acid anhydride, terephthalic acid, isophthalic acid, adipic acid, azelaic acid and sebacic acid. The following are examples of suitable diamines: 1,6-Diaminohexane, 1,12-diaminododecane, 1,3- and 1,4-diaminocyclohexane, m- and p-phenylendiamine, bis-[4-aminocyclohexyl]methane and amines corresponding to the following general formula (III)

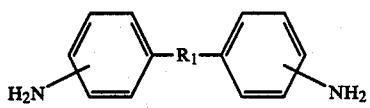
(III)

wherein $R_1$ denotes, for example, the following groups

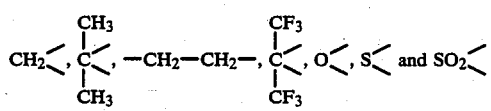

and which may be further substituted with halogen and alkyl groups. The mixtures are preferably prepared from 4,4'-diaminodiphenylether and m-phenylenediamine.

The preparation of the polymers according to the invention may be influenced by catalysts, for example by amines such as triethylamine, 1,4-diazobicyclo-(2,2,2)-octane, 2-methylimidazole and pyridine; by inorganic and organic metal compounds such as compounds of iron, lead, zinc, tin, copper, cobalt, nickel or titanium, e.g. cobalt acetate, lead oxide, dibutyl tin dilaurate, copper acetylacetonate, nickel acetate, alkali metal phenolates and sodium cyanide, by boron derivatives such as boric acid, and by phosphorus compounds such as trialkylphosphine, methyl phospholine oxide, triphenylphosphite, triphenylphosphate and polyphosphoric acid. The compounds preferably used are pyridine, boric acid, triphenylphosphite and triphenylphosphate.

The thermoplasts according to the invention are distinguished by their exceptional E-moduli and dimensional stability under heat. Their properties may be varied for different fields of application by altering the stoichiometric ratios or the degree of condensation and by adding low molecular weight and high molecular weight components such as fillers, pigments, age-resistors, lubricants, plasticizers and other polymers.

The polyimides according to the invention may also be worked up into films by the (blow) extrusion process.

The following abbreviations are used in the experimental examples: BPAP 2,2-bis-phthalic acid anhydro-(4)-propane BAPP 2,2-bis-[4-aminophenoxyphenyl]-propane.

The relative viscosity is determined on one percent solutions in m-cresol at 25° C. unless otherwise indicated.

EXAMPLE 1

80.36 g of 2,2-Bis-[4-aminophenoxyphenyl]-propane (BAPP) and 1.48 g of dodecylamine are dissolved in 430 g of N-methylpyrrolidone.67.2 g of 2,2-bis-phthalic acid anhydro-(4)-propane (BPAP) are then introduced with cooling at 15° to 20° C. The solution is stirred for a further 6 hours at room temperature. 250 g of toluene are then added, an esterification attachment is connected and the temperature is raised to the reflux temperature. The water formed in the course of the reaction is distilled off azeotropically in the course of about 3 hours and separated by the esterification attachment. The esterification attachment is then replaced by a distillation bridge and the toluene is distilled off. The reaction mixture is stirred for about a further 6 hours at 180° C. and a vacuum is repeatedly applied until distillation begins. A light brown, viscous solution of the polyimide is obtained, which is introduced dropwise into methanol. The polyimide precipitates in the form of colourless spheres and these are separated off and dried under vacuum. The temperature, starting from 50° C., is raised stepwise to 200° C. The relative viscosity of a 1% solution of the polyimide in N-methylpyrrolidone at 25° C. is $\eta_{rel.}=1.58$. A solution in methylene chloride shows the characteristic bands for imides at 1725 and 1785 cm$^{-1}$ in the IR spectrum. A sample of the resin is pressure moulded to a light brown product under a pressure of 200 bar at 280° C.

EXAMPLE 2

40.18 g of BAPP and 0.74 g of dodecylamine are dissolved in 260 g of N-cyclohexylpyrrolidone. 33.6 g of BPAP are then introduced at 15° to 20° C. and stirring is continued for 3 hours at this temperature. The temperature is then raised to 160° C. in the course of 6 hours under a water jet vacuum and the reaction is completed under reflux in about 3 hours. A viscous solution of the polyimide is obtained, which is diluted with dimethylacetamide and then introduced dropwise into methanol. The polyimide precipitates in the form of white spheres. The relative viscosity is $\eta_{rel.}^{25}=1.71$, determined at 25° C. on a 1% solution in m-cresol.

A sample of the polyimide prepared as described above is converted into an elastic moulded product at 300° C. Differential thermoanalysis indicates a glass transition temperature of 224° C.

EXAMPLE 3

The reaction is carried out under the conditions of Example 2 but in 300 g of tetramethylenesulphone as solvent. Precipitation in methanol yields a colourless polyimide having a relative viscosity of $\eta_{rel.}^{25}=1.87$ determined on a 1% solution in m-cresol.

EXAMPLE 4

321.4 g of BAPP and 5.92 g of dodecylamine are dissolved in 1700 g of m-cresol 70, a commercial mixture of 70% m- and 30% p-cresol. 268.8 g of BPAP are then introduced with cooling at 15° to 20° C.

A viscous solution is obtained, which is then stirred for 4 hours at room temperature and for 2 hours at each of the temperatures 120°, 150°, 180° and 190° C. Partial distillation under vacuum is carried out several times during the reaction to remove water. The reaction mixture is cooled, diluted with 2 kg of methylene chloride and precipitated in methanol. The precipitation product is dried, dissolved in dimethylacetamide and again precipitated in methanol. The polyamide is obtained in the form of white spheres, which are dried in a water jet vacuum at a temperature which is slowly raised to 200° C. The relative viscosity of a 1% solution in m-cresol is $\eta_{rel.}{}^{25}=1.62$.

Transparent test samples having a flexural strength of 160 mPa, an E-modulus (flexion) of 3100 mPa and a softening temperature of Vicat B=220° C. are obtained by working up this polyimide by injection moulding at temperatures in the region of 340° C.

EXAMPLE 5

642.8 g of BAPP, 11.84 g of dodecylamine and 537.6 g of BPAP are reacted in 3500 g of m-cresol under the reaction conditions of Example 4. A light brown solution of the polyimide having a solids content of about 25% by weight and a viscosity $\eta_{rel.}{}^{25}$ of 68,400 mPa.s is obtained.

The polyimide solution prepared as described above is concentrated in a ZSK evaporation extruder at a maximum jacket temperature of 330° C. and a pressure of 10 mbar. A transparent, elastic resin is obtained which has a relative viscosity of $\eta_{rel.}{}^{25}=1.62$ determined on a 1% solution in m-cresol.

|  | $C_{46}H_{34}N_2O_6$ (710) | | |
|---|---|---|---|
|  | C | H | N |
| Calculated | 77.8 | 4.8 | 3.9 |
| Found | 77.4 | 5.1 | 3.8 |

EXAMPLE 6

40.18 g of BAPP and 0.74 g of dodecylamine are dissolved in 300 g of chlorobenzene in a stirrer flask with esterification attachment. 33.6 g of BPAP are then introduced at room temperature and the reaction mixture is stirred for 6 hours at room temperature, and then heated at the reflux temperature for 7 hours. The water formed in the reaction is separated in the esterification attachment. The reaction product, which is a clear, viscous solution, is diluted with dimethylacetamide when cold and then introduced dropwise into acetonitrile. The polyimide is obtained in the form of white beads having a relative viscosity of $\eta_{rel.}{}^{25}=1.92$. A sample of the polyimide is moulded under a pressure of 200 bar at 290° C. to form a clear, elastic disc.

EXAMPLE 7

300 g of o-dichlorobenzene, 40.18 g of BAPP, 0.74 g of dodecylamine and 33.6 g of BPAP are reacted together as in Example 6. The polyimide solution diluted with dimethylacetamide is precipitated in methanol. The solution viscosity of the reaction product determined in m-cresol is $\eta_{rel.}{}^{25}=1.94$.

EXAMPLE 8

40.18 g of BAPP, 10.58 g of m-phenylenediamine and 0.74 g of aniline are dissolved in 450 g of m-cresol. 67.2 g of BPAP are then introduced at 15° to 20° C. The mixture changes into a highly viscous solution in the course of 6 hours at room temperature. It is then heated under reflux for 6 hours against a reflux condenser which is maintained at 140° C.

The reaction mixture is cooled, diluted with methylene chloride in proportions of 1:1 and precipitated in methanol. The polyimide is obtained in the form of white spheres. The solution viscosity is $\eta_{rel.}{}^{25}=1.85$. A sample of the resin is moulded under a pressure of 200 bar at 300° C. to form a clear, elastic product.

EXAMPLE 9

80.36 g of BAPP, 0.74 g of aniline and 67.2 g of BPAP are reacted together in 560 g of m-cresol as in Example 8. An approximately 20% solution of the polyimide in cresol having a viscosity of 318,000 mPa.s is obtained. The solution is diluted with methylene chloride and the polyimide is precipitated by dropwise introduction into methanol. The solution viscosity of the polyimide determined on a 1% solution in m-cresol is $\eta_{rel.}{}^{25}=2.01$.

We claim:

1. Thermoplastic polyimides from 2,2-bis-phthalic acid anhydro-(4)-propane and 2,2-bis[4-aminophenoxyphenyl]-propane and optionally further diamines, acids or acid anhydrides.

2. Process for the production of polyimides according to claim 1, characterized in that in a first stage the polyimides are prepared in a solvent and they are then concentrated in an evaporation extruder at temperatures of from 250° to 400° C., optionally under vacuum, and are optionally condensed.

3. Process for the production of polyimides according to claim 1, characterized in that in a first stage, the polyimides are prepared in a solvent and they are then precipitated with a non-solvent.

4. Process for the production of polyimides according to claim 1, characterized in that for the preparation of the polyimides, 2,2-bis-phthalic acid anhydro-(4)-propane is mixed with other polycarboxylic acids or their anhydrides or the 2,2-bis-[4-aminophenoxy-phenyl]propane is mixed with other diamines.

5. A process according to claim 4, wherein the 2,2-bis-phthalic acid anhydro-(4)-propane is mixed with other polycarboxylic or their anhydrides and the 2,2-bis-[4-aminophenoxyphenyl]-propane is mixed with other diamines.

6. A blow extrusion film comprising polyimides according to claim 1.

* * * * *